(12) United States Patent
Webber et al.

(10) Patent No.: US 10,291,278 B2
(45) Date of Patent: May 14, 2019

(54) CASE FOR A PERSONAL ELECTRONIC DEVICE AND METHOD FOR CREATING SAME

(71) Applicant: Carved, LLC, Elkhart, IN (US)

(72) Inventors: John Webber, Elkhart, IN (US); Eric Richardson, Syracuse, IN (US); Alex Gorsuch, Middlebury, IN (US)

(73) Assignee: CARVED, LLC, Elkhart, IN (US)

( * ) Notice: Subject to any disclaimer, the term of this patent is extended or adjusted under 35 U.S.C. 154(b) by 291 days.

(21) Appl. No.: 15/198,838

(22) Filed: Jun. 30, 2016

(65) Prior Publication Data

US 2018/0006675 A1 Jan. 4, 2018

(51) Int. Cl.

| | | |
|---|---|---|
| H04B 1/3888 | (2015.01) | |
| B29C 43/18 | (2006.01) | |
| B29C 70/88 | (2006.01) | |
| B29C 70/26 | (2006.01) | |
| H04M 1/18 | (2006.01) | |
| B29C 43/56 | (2006.01) | |
| B29L 31/34 | (2006.01) | |
| B29K 711/14 | (2006.01) | |
| B29K 711/00 | (2006.01) | |
| H04M 1/02 | (2006.01) | |
| B29C 43/52 | (2006.01) | |

(52) U.S. Cl.
CPC .......... *H04B 1/3888* (2013.01); *B29C 43/18* (2013.01); *B29C 43/56* (2013.01); *B29C 70/26* (2013.01); *B29C 70/88* (2013.01); *H04M 1/185* (2013.01); *B29C 43/52* (2013.01); *B29C 2043/561* (2013.01); *B29C 2793/009* (2013.01); *B29K 2711/00* (2013.01); *B29K 2711/14* (2013.01); *B29L 2031/3437* (2013.01); *B29L 2031/3481* (2013.01); *H04M 1/0283* (2013.01)

(58) Field of Classification Search
None
See application file for complete search history.

(56) References Cited

U.S. PATENT DOCUMENTS

2015/0111623 A1* 4/2015 Hegemier .......... H04M 1/0283
455/575.1

\* cited by examiner

*Primary Examiner* — Monica A Huson
(74) *Attorney, Agent, or Firm* — Bishop, Diehl & Lee, Ltd.

(57) ABSTRACT

A personal electronic device case, and method for making such personal electronic device case, created by a method of bonding a resin-type material to a selected material otherwise unsuitable for protection of a personal electronic device, and carving the resulting composition into a desired shape of personal electronic device case. The resulting phone case is both aesthetically pleasing and offers improved protection for the personal electronic device.

10 Claims, 2 Drawing Sheets
(1 of 2 Drawing Sheet(s) Filed in Color)

CASE FOR A PERSONAL ELECTRONIC DEVICE AND METHOD FOR CREATING SAME

RELATED APPLICATIONS

None

TECHNICAL FIELD OF THE INVENTION

The present invention relates to protective and decorative cases for electronic devices such as, for example, a cellular phone, as well as a method for creating such cases.

BACKGROUND OF THE INVENTION

The portability and expense of personal electronic devices, which are ubiquitous in today's society, have created a need for protecting such devices during transport and everyday use. The high expense of such personal electronic devices justifies the use of a protective case to protect such a valuable and vital investment. Additionally, the use of cases for personal electronic devices allows consumers the opportunity to display their unique aesthetic tastes. Some consumers go so far as to consider their personal electronic device case to be a fashion accessory. As a result, the market for personal electronic device cases is a crowded one offering seemingly endless design options. However, few unique designs stand out among the crowd. Furthermore, designs which are truly aesthetically unique often come at a cost of the functionality of the case itself; that is, the cases often provide less protection for the electronic device.

For example, phone cases incorporating organic materials such as dried flowers or leaves are known in the art, along with cases incorporating or consisting of wood. Additionally, methods of reinforcing wood or cellulosic material by bonding the material to a resin are known.

SUMMARY OF THE INVENTION

The present invention seeks to provide an improved case for a personal electronic device and an improved method for creating said improved case that is capable of incorporating materials which are not otherwise suitable for protecting a personal electronic device, while simultaneously providing substantial protection for the personal electronic device.

Each of the above-outlined existing cases has certain undesirable qualities. For example, phone cases incorporating organic materials such as flowers and leaves may maintain their weak qualities and result in less protection for the personal electronic device. Often, the organic materials are simply encased in plastic. Additionally, the incorporation of such materials is possible only in relatively small amounts, otherwise, the integrity and structure of the case may be compromised.

Additionally, existing cases consisting of or incorporating wood in its natural state may provide for decreased protection of the personal electronic device. Furthermore, weaker or smaller pieces of wood, including reclaimed wood, might not be used at all. Additionally, wood in its natural state is very susceptible to dimensional and other physical changes as a result of changes in temperature and humidity.

Methods for reinforcing wood or cellulosic material by bonding such material to a resin are known in the art. Cases for personal electronic devices have been made using such methods. However, the previous methods did not afford the increased structural strength achieved by the presently claimed method.

There is disclosed herein an improved case for an electronic device and improved method for creating said improved case which seeks to solve the disadvantages and problems present in the prior art. Specifically, there is disclosed herein an improved case for an electronic device, and method for making same, which incorporates materials which are otherwise unsuitable for protection of the electronic device, without sacrificing protection of the electronic device.

Generally speaking, the process as claimed results in a fortified and reinforced plastics-material composite which may be carved or cut into a final desired shape of personal electronic device case.

In an exemplary embodiment, wood is selected as the material to be incorporated. The selected wood may be wood that has been reclaimed from a significant source. For example, wood reclaimed from ships and stadium benches have been used in the present invention to create a unique phone case.

In various exemplary embodiments, the method generally comprises the steps of selecting one or more substantially solid materials to be incorporated into the personal electronic device case, applying a first substantially liquid material to and around the substantially solid materials such that the substantially solid materials are substantially covered by the first substantially liquid material to create a first composite, subjecting the resulting first composite to a drawn vacuum for a first defined time period, heating the first composite to a desired temperature for a second defined time period, applying a second substantially liquid material to the first composite to create a second composite, applying a desired pressure to the second composite for a third defined time period, cutting the second composite into a desired shape of personal electronic device case. It should be appreciated that during various exemplary embodiments of the process, the first and second substantially liquid materials are cured to for a substantially solid piece in either the first composite, second composite or both. In other words, at the end of the process, the cured composite material is substantially solid.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
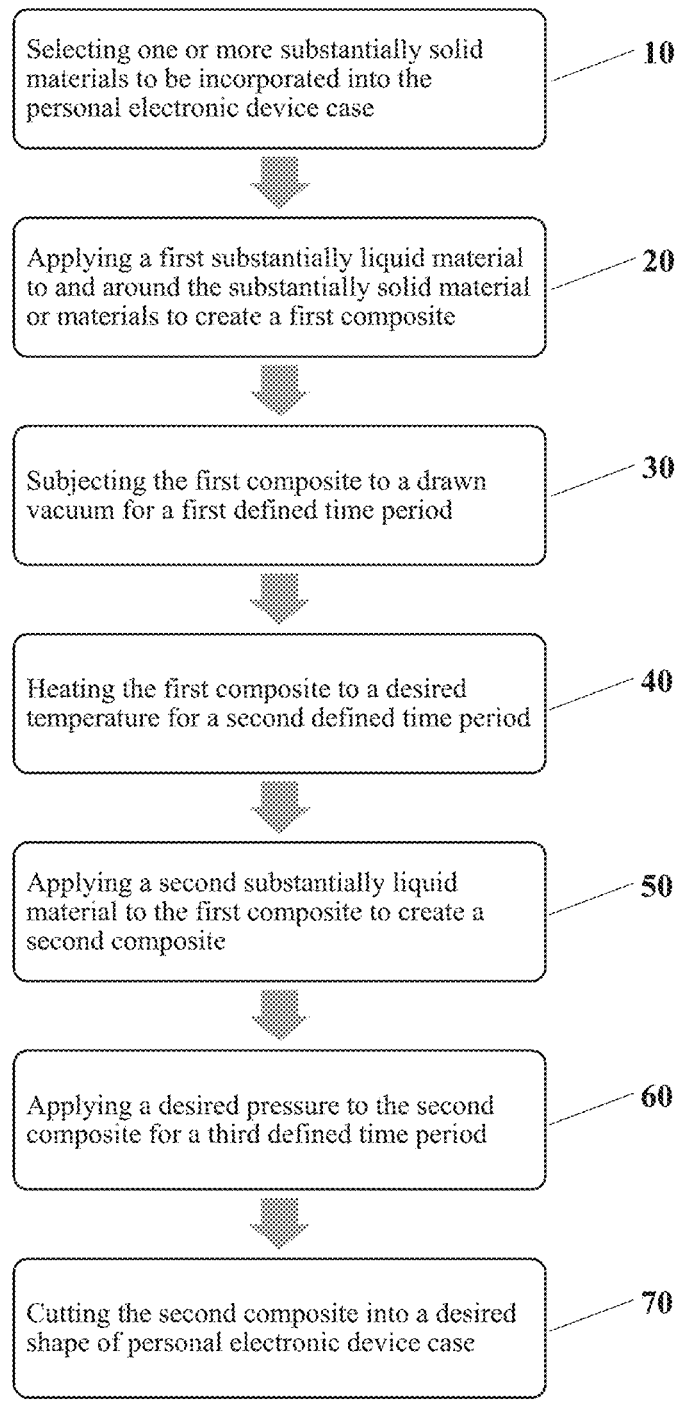
FIG. 1 is a flow diagram depicting a method in accordance with the present invention.

While this invention is susceptible of embodiments in many forms, there is shown and described in the drawings and will herein be described in detail at least one preferred embodiment of the invention with the understanding that the present disclosure is to be considered as an exemplification of the principles of the invention and is not intended to limit the breadth of the invention to any of the specific embodiments illustrated or described. The following description of detailed embodiments is for exemplifying the principles and advantages of the invention.

Referring to FIG. 1, a flowchart outlining the steps of a method in accordance with the present invention is shown. The process begins at Step 10 where one or more substantially solid materials to be incorporated into the personal electronic device case are selected. It should appreciated that a wide variety of materials may be selected to be incorporated. It should also be appreciated that a material is substantially solid if it has, for example, a defined shape and size. It should also be appreciated that a substantially solid material may be pliable, flexible, deformable, or rigid. In various exemplary embodiments the material is wood, however, many materials which are not otherwise suitable for protection of a personal electronic device may be selected. For example, paper and other cellulosic materials have been found to be suitable for use with the present invention. Likewise, other substantially solid but not rigid materials may be used such as, for example, dried flowers, foams, natural or synthetic fibers, and any other known or later-developed substantially solid material.

The process continues to Step 20 where a first substantially liquid material is applied to and around the substantially solid material or materials to create a first composite. This may be done by hand or by other means, including automatic means or submersion. The first substantially liquid material may be selected from a variety of known or later-developed materials which are capable of being cured into a solid by heat or other means. This may include, for example, commercially-available resins and epoxies. It should be appreciated that the first substantially liquid material may react with the one or more substantially solid materials or an additional material added to the first composite to permit or aid the first substantially liquid material in curing. In various exemplary embodiments, the substantially liquid material is only temporally substantially liquid and may solidify due to, for example, cooling, exposure to air, heat or the like. In various other exemplary embodiments, the first substantially liquid material may be a composite material such as, for example, a two part epoxy. It should also be appreciated that in various exemplary embodiments, the substantially liquid material may be transparent, translucent, or opaque, and may be any color, to allow for different aesthetic designs and qualities in the resulting final product. It should also be appreciated that multiple substantially liquid materials may be applied at this step, for example, two or more different colors of resin.

The process continues to Step 30 where the first composite is subjected to a drawn vacuum for a first defined time period. This step has the advantage of allowing the first substantially liquid material to be pulled into voids and crevices in the material to be incorporated into the phone case. For example, if wood is selected, this step will allow the resin to penetrate into the natural cracks and void spaces present in natural wood. It should be appreciated that the precise pressure of the vacuum may vary depending on the equipment used and the materials selected. A vacuum pump attached to a vacuum chamber has been found to work. Additionally, the precise time for which a vacuum must be applied may vary depending on the strength of the vacuum and the types of voids and crevices present in the selected solid material to be incorporated. In an exemplary embodiment, wood is the selected material to be incorporated, and the first composite is subjected to a vacuum for approximately one to three hours. It will be apparent to one of ordinary skill in the art, without undue experimentation, what length of time is sufficient to complete this step.

The process continues to Step 40 where the first composite is heated to a desired temperature for a second defined time period. It should be appreciated that the desired temperature and second defined time period will vary depending on what first substantially liquid material is selected. For commercially-available materials, these parameters may come from the manufacturer of such materials. This step is intended to cure and solidify the first substantially liquid material. Thus, the required length of time and temperature will be available to one of ordinary skill in the art without undue experimentation. In an exemplary embodiment, the first composite is heated to approximately 200 degrees Fahrenheit for approximately one to two hours.

The process continues to Step 50 where a second substantially liquid material is applied to the first composite to create a second composite. In an exemplary embodiment, the first composite is placed in a silicone mold prior to Step 50. The second substantially liquid materially is selected from various known or later-developed materials which are capable of hardening or setting when exposed to air. Several of such materials are commercially available, including epoxies and resins. It should be appreciated that the second substantially liquid material may react with the first composite or an additional material added to the second composite to permit or aid the second substantially liquid material in curing. In various exemplary embodiments, the substantially liquid material is only temporally substantially liquid and may solidify due to, for example, cooling, exposure to air, heat or the like. In various other exemplary embodiments, the second substantially liquid material may be a composite material such as, for example, a two part epoxy. It should also be appreciated that, in various exemplary embodiments, the substantially liquid material of Step 50 may be transparent, translucent, or opaque, and may be any color, to allow for different aesthetic designs and qualities in the resulting final product. It should also be appreciated that multiple substantially liquid materials may be applied at this step, for example, two or more different colors of epoxy.

The process continues to Step 60 where a desired pressure is applied to the second composite for a third defined time period. This step is intended to allow the second substantially liquid material to permeate and fill any voids or crevices which remain in the second composite. The precise desired pressure and length of the third defined time period may vary depending on the types and numbers of voids and crevices present in the second composite. The necessary pressure and time period will be apparent to one of ordinary skill in the art. In an exemplary embodiment, the desired pressure is approximately 50-70 psi and the third defined time period is approximately twenty-four (24) hours.

The process continues to Step 70 where the second composite is cut or otherwise shaped into a desired shape of personal electronic device case. In an exemplary embodiment, the second composite is cut into a block using a band saw and then the desired shape of personal electronic device case is carved out using a CNC machine. The resulting case may be sanded to achieve a smooth finish, and a finish, sealant, or other coating may be applied if desired. Buttons, switches, and apertures, and reinforcements thereof, may be added as necessary or desired for operation of the personal electronic device.

It should be appreciated that the present invention may be applied to create cases for a wide variety of personal electronic devices. The present invention is not limited to certain personal electronic devices, but can be applied to create cases to protect a wide range of personal electronic devices.

Figure 2:
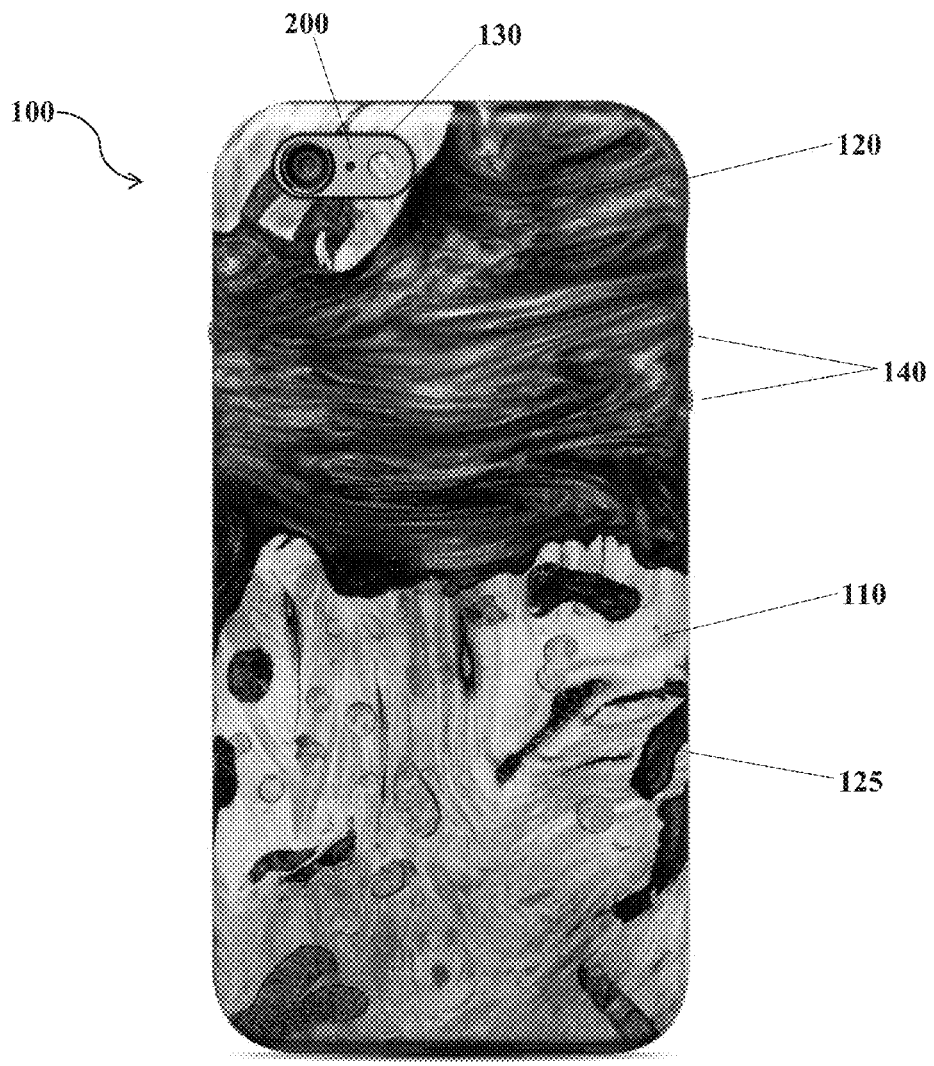
FIG. 2 is a color photograph depicting a case for a personal electronic device in accordance with the present invention.

Referring to FIG. 2, a case 100 for a personal electronic device 200 prepared in accordance with the present invention is shown. The case 100 incorporates selected substantially solid material 110. In this particular embodiment, the selected substantially solid material is wood, but other substantially solid material or materials may be selected. Cellulosic materials, such as wood or paper, have been found to work particularly well with the present method. The case 100 is constructed of substantially solid material 110 and cured material 120. The composition of the cured material 120 is a hybrid material resulting from the multi-step addition of a first substantially liquid material and a second substantially liquid materials, as detailed in Step 20 and Step 50 of FIG. 1. Returning to FIG. 2, the ratio and distribution of the first and second substantially liquid materials in cured material 120 will vary depending on the selected substantially solid material 110 and by small variations in the way that the first and second substantially liquid materials are applied during Step 20 and Step 50 of FIG. 1. Turning back to FIG. 2, filled void space 125 shows where the cured material 120 has filled a void space in substantially solid material 110. Depending on the shape of selected material 110, a unique number and pattern of filled void spaces may be present in case 100. In the present embodiment, case 100 has an aperture 130 and buttons 140 which allow for operation of personal electronic device 200.

What is claimed is:

1. A method for creating a case for a personal electronic device comprising the steps of:
    selecting one or more substantially solid materials to be incorporated into said case;
    applying a first substantially liquid material to and around said substantially solid materials such that said substantially solid materials are substantially covered by said first substantially liquid material to create a first composite;
    subjecting said first composite to a drawn vacuum for a first defined time period;
    heating said first composite to a desired temperature for a second defined time period;
    applying a second substantially liquid material to said first composite to create a second composite;
    applying a desired pressure to said second composite for a third defined time period;
    cutting the second composite into a desired shape of personal electronic device case.

2. The method of claim 1, wherein at least one substantially solid material to be incorporated is wood.

3. The method of claim 1, wherein at least one substantially solid material to be incorporated is a cellulosic material.

4. The method of claim 1, wherein the first substantially liquid material is substantially transparent.

5. The method of claim 1, wherein the second substantially liquid material is substantially transparent.

6. The method of claim 1, wherein the first substantially liquid material is substantially translucent.

7. The method of claim 1, wherein the second substantially liquid material is substantially translucent.

8. The method of claim 1, wherein the first substantially liquid material is comprised of at least two substantially liquid sub-materials.

9. The method of claim 1, wherein the second substantially liquid material is comprised of at least two substantially liquid sub-materials.

10. The method of claim 1, wherein the first defined time period is between approximately one and three hours, the second defined time period is between approximately one and two hours, the third defined time period is approximately 24 hours, the desired temperature is approximately 200 degrees Fahrenheit, and the desired pressure is approximately 60-70 psi.

* * * * *